(No Model.)
J. J. COYLE.
STALK CUTTER.
No. 287,248. Patented Oct. 23, 1883.
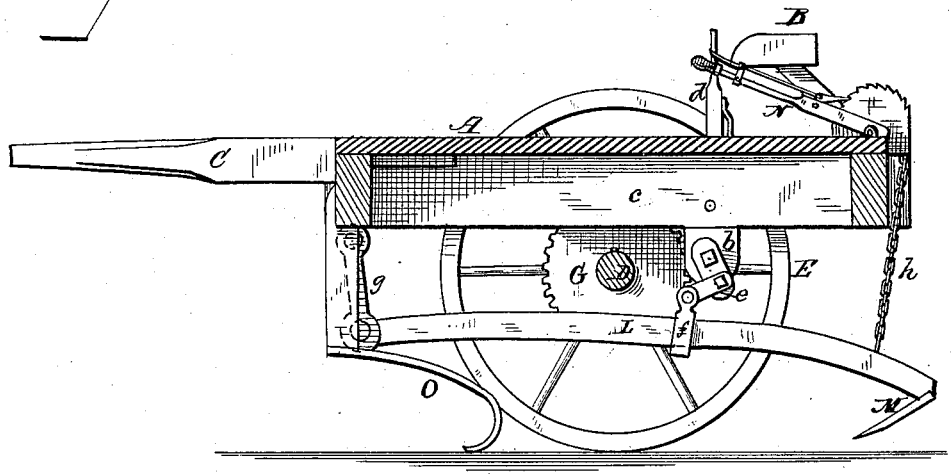
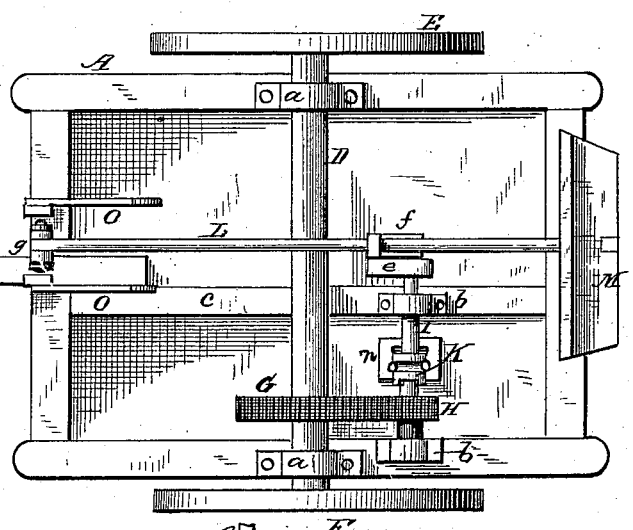
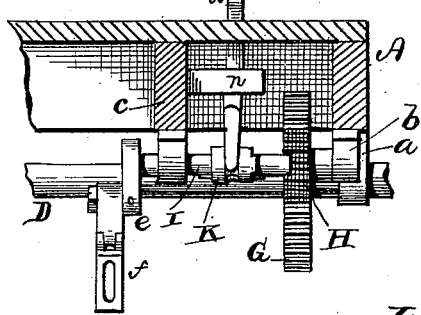
WITNESSES
F. L. Ourand
N. E. Oliphant
INVENTOR
John J. Coyle,
per Chas. H. Fowler.
Attorney

UNITED STATES PATENT OFFICE.

JOHN J. COYLE, OF HONEY CREEK, IOWA.

STALK-CUTTER.

SPECIFICATION forming part of Letters Patent No. 287,248, dated October 23, 1883.

Application filed April 26, 1883. (No model.)

*To all whom it may concern:*

Be it known that I, JOHN J. COYLE, a citizen of the United States, residing at Honey Creek, in the county of Pottawattamie and State of Iowa, have invented certain new and useful Improvements in Stalk-Cutters; and I do hereby declare that the following is a full, clear, and exact description of the same, reference being had to the annexed drawings, making a part of this specification, and to the letters and figures of reference marked thereon.

Figure 1 of the drawings is a side elevation, partly in section; and Fig. 2, a bottom plan view of my invention. Fig. 3 is a detail view of the mechanism which operates the knife-beam.

This invention relates to certain new and useful improvements in stalk-cutters, the objects thereof being to provide such a device as will be simple and durable in its construction, easy and effective in its operation, and which will not become clogged or drag, at the same time cutting the stalks closer and leaving the ground in better condition for plowing; also, the cutting apparatus is readily raised from and held above the ground in removing from one place to another, thus preventing the knife from coming in contact with stones or other hard substances liable to damage the cutting-edge. These objects I attain by the construction substantially as shown in the accompanying drawings and hereinafter more fully described.

In the drawings, A represents a suitable frame, of ordinary construction, supporting a seat, B, for the driver, a tongue, C, being connected to the front end of said frame. Journaled in suitable bearings, $a$, upon the under side of the frame A, is an axle or shaft, D, to the respective ends of which are secured driving-wheels E F, the one E being loose while the one F is tight upon said shaft, so that the machine may be turned around without straining. Keyed to the axle or shaft D is a large gear-wheel, G, which meshes with a small gear-wheel, H, placed loosely on a short shaft, I, journaled in bearings $b$, secured to the under face of one side of the frame A, and a brace-piece, $c$, said small gear-wheel engaging with a clutch, K, operated by a lever, $d$, hung in a boxing, $n$, extending upward to within easy reach of the driver. Upon one end of the short shaft I is secured a crank, $e$, which in turn connects by a link with a suitable stirrup, $f$, which supports a beam, L, having a knife, M, secured to its rear end, its front end being hung in a stirrup, $g$, loosely connected to the front portion of the frame A, said swinging beam and knife being raised and lowered by means of a suitable ratchet-lever, N, and chain $h$. To the front end of the frame are connected suitable hooks, $o$, which drag along the ground and straighten such stalks as may be too much bent, so as to bring them under the knife.

It will be seen by the above description that a swinging motion is imparted to the knife, thereby preventing the same from becoming clogged, as is frequently the case with stalk-cutters employing revolving knives, and in this instance, there being only one knife to keep in order, much time is saved in sharpening, and the knife being secured to a swinging beam, it runs easier and lighter than a revolving cutter; also, as the said knife works in a vertical direction, extra weight is not needed to make it cut the stalks readily and rapidly, and at the same time shorter and better, so that there will be no difficulty experienced in plowing them under.

Though I have only described one set of gearing, it is obvious that a double gear may be employed, if desired, to give the knife a more rapid and stronger cut.

Having now fully described my invention, what I claim as new, and desire to secure by Letters Patent, is—

In a stalk-cutter, the beam L, extending along horizontally under the frame A, and having the knife M connected thereto at an acute angle, as shown, and supported at its forward end by stirrup $g$, and near its middle by stirrup $f$, and at its rear by chain $h$, in combination with the shaft I, crank $e$, and suitable gearing for operating said shaft, substantially as and for the purpose set forth.

In testimony that I claim the above I have hereunto subscribed my name in the presence of two witnesses.

JOHN JAMES COYLE.

Witnesses:
JAS. W. FRAZIER,
DOUGLAS POINTS.